(12) United States Patent
Matas et al.

(10) Patent No.: US 8,909,297 B2
(45) Date of Patent: Dec. 9, 2014

(54) ACCESS MANAGEMENT

(76) Inventors: Mike Matas, San Francisco, CA (US);
Marcel M W A van Os, San Francisco, CA (US); Scott Forstall, Mountain View, CA (US)

( * ) Notice: Subject to any disclaimer, the term of this patent is extended or adjusted under 35 U.S.C. 154(b) by 1253 days.

(21) Appl. No.: 12/042,268

(22) Filed: Mar. 4, 2008

(65) Prior Publication Data

US 2009/0227232 A1 Sep. 10, 2009

(51) Int. Cl.
*H04B 1/38* (2006.01)
*H04M 1/665* (2006.01)

(52) U.S. Cl.
CPC .......... *H04M 1/665* (2013.01); *H04M 2250/22* (2013.01)
USPC .......... 455/566; 715/779; 715/765; 715/778; 455/456.1; 455/565

(58) Field of Classification Search
None
See application file for complete search history.

(56) References Cited

U.S. PATENT DOCUMENTS

| 6,657,538 B1 * | 12/2003 | Ritter ........................... 340/5.81 |
| 7,954,064 B2 * | 5/2011 | Forstall et al. ................ 715/779 |
| 2008/0072283 A1 * | 3/2008 | Relyea et al. .................... 726/2 |

* cited by examiner

*Primary Examiner* — Charles Appiah
*Assistant Examiner* — Randy Peaches
(74) *Attorney, Agent, or Firm* — Womble Carlyle Sandridge & Rice, LLP

(57) ABSTRACT

Methods, computing devices and computer-readable media for access management are disclosed. A method of passcode authentication includes: maintaining a count for failed authentication attempts, displaying a visual representation of a current count for failed authentication attempts on an authentication interface. An additional method of passcode authentication is also disclosed which includes: maintaining a count for failed authentication attempts; determining a current authentication request invalid; determining a delay time based on the count for failed authentication attempts; and delaying submission of a second authentication attempt until after the delay time has expired, wherein the delaying submission manifests in a delayed visual feedback of user input, in a delayed processing of user input, or in an inability to enter user input for during the delay time.

21 Claims, 8 Drawing Sheets

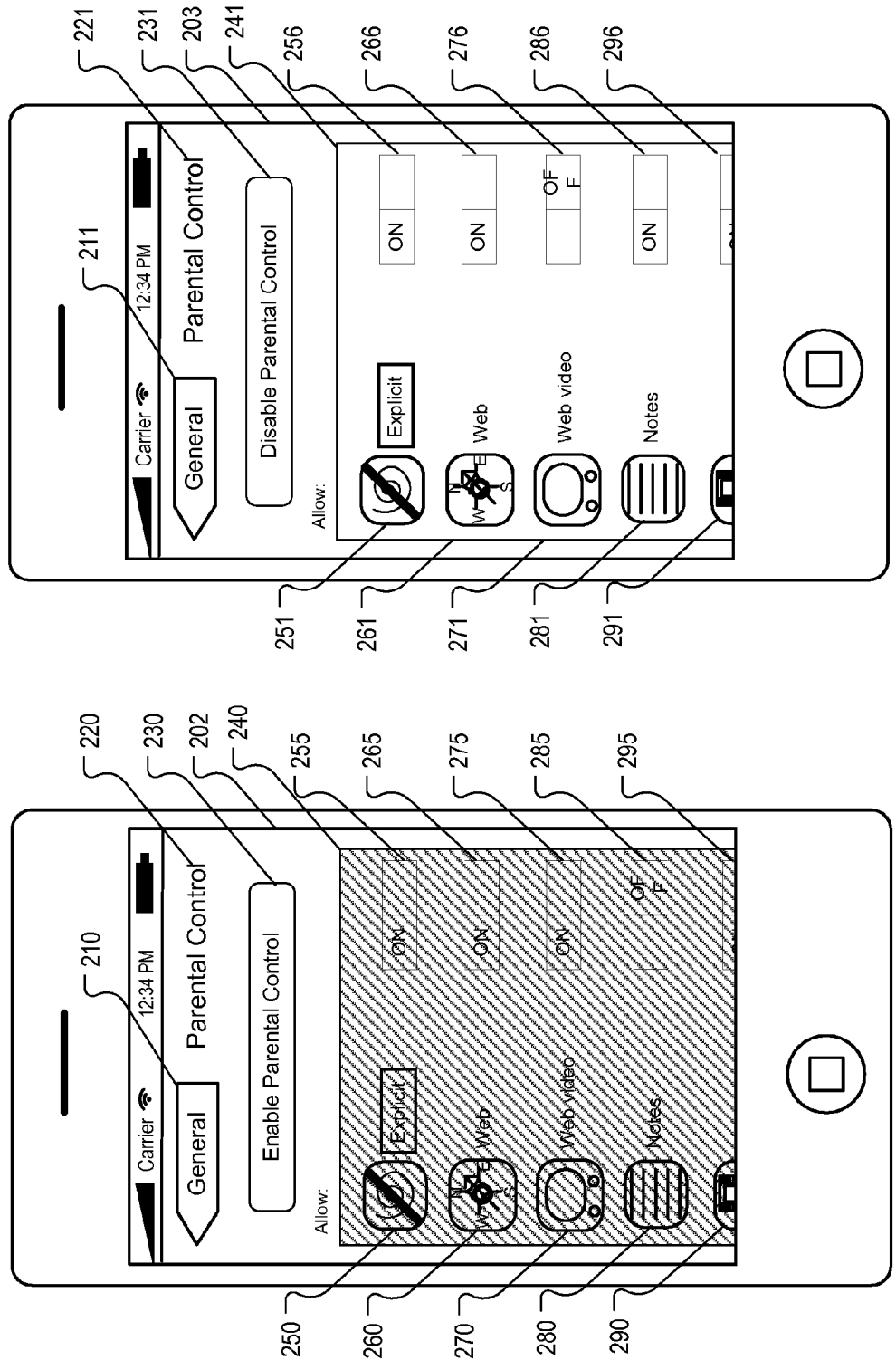

ACCESS MANAGEMENT

TECHNICAL FIELD

This subject matter is generally related to access management.

BACKGROUND

Mobile devices have become an integral part of everyday life for adults and children alike. Mobile devices such as portable computers, Personal Data Assistants (PDAs), mobile phones, media players, and even handheld gaming consoles can provide functionality, content, and data access and management. The functionality provided by mobile devices can aid in communications, such as email, telephone, and instant messaging; professional activities, such as stock trading, scheduling, and contact management; everyday personal activities, such as personal calendar, photos, camera, maps, restaurant guide, to-do list, and online shopping activities; and entertainment activities, such as web browsing, music, videos, games, and the online versions of each.

The existence of large amounts of personal data on a mobile device heightens the importance of privacy protection against unauthorized access. The multimedia capabilities of mobile devices and the availability of multimedia content on the Internet present new challenges for parents to protect their children from inappropriate exposures. Certain functionalities on a mobile device can require additional chargeable services from third parties.

Conventional software access management can be implemented in a number of forms, including the use of passcode authentication. Typically, when a user attempts to access a restricted program, data or functionality, an access control authentication interface is displayed and the user is required to enter a passcode (e.g., a series or a combination of symbols from a hardware or virtual keypad). The user is provided access to the restricted programs, data, or functionality only if he provides a correct passcode. An example of access management is parental control in a multifunction mobile device.

SUMMARY

Methods, computing devices and computer-readable media for access management are disclosed. A method of passcode authentication includes: maintaining a count for failed authentication attempts, displaying a visual representation of a current count for failed authentication attempts on an authentication interface. An additional method of passcode authentication is also disclosed which includes: maintaining a count for failed authentication attempts; determining a current authentication request invalid; determining a delay time based on the count for failed authentication attempts; and delaying submission of a second authentication attempt until after the delay time has expired, wherein the delaying submission manifests in a delayed visual feedback of user input, in a delayed processing of user input, or in an inability to enter user input for during the delay time. A method for software access management is disclosed which includes: receiving a user selection in an access management interface regarding an access setting of an object; identifying an attribute of the object regarding whether to conceal the object in a user interface; modifying the attribute of the object according to the user selection such that a restricted object is concealed in a user interface while an unrestricted object is displayed in a user interface.

DESCRIPTION OF DRAWINGS

FIG. 2A illustrates an example user interface for enabling parental controls on the mobile device of FIG. 1A.

FIG. 2B illustrates an example user interface for disabling parental controls on the mobile device of FIG. 1B.

DETAILED DESCRIPTION

Software Access Control Challenges and Solutions

The need for software access management in mobile devices has been evident since early on. While long and complicated passcodes are harder to crack, sometimes device owners prefer a simpler or shorter passcode that is more convenient to enter and easier to remember. This means that repeated attempts at entering passcode guesses can sometimes succeed, and the passcode access control will fail. Furthermore, even the most sophisticated access management programs can seem vulnerable before a particularly motivated and persistent hacker. Sometimes, it is more prudent to focus on curtailing such motivation rather than on improving the security barriers further. Some conventional software access controls implement a complete lock-down of a device when an unreasonable number of failed passcode attempts have occurred. However, sometimes it is more desirable to deter passcode guessing in a way that leaves the device generally available without the restricted data and functionalities should such guessing ceases.

Motivation to breach access control can be diminished by concealing the existence of restricted data and functionalities in user interfaces outside of the access controlled environment. Persistence at entering passcode guesses can also be diminished by increasing certain annoyances associated with operating the device with each additional failed passcode attempts. For example, with prolonged device response time or increasing visual or audio disturbances in the device with each successive passcode failure, the hacker may lose patience and soon give up his attempt. Sometimes, attempts at breaching the passcode can be further discouraged when a visual alert of the past failed attempts is displayed. Such visual alert will be even more effective if it persists outside of the access control authentication interface, such that the true owner will be alerted of such past attempts without going into the access management authentication interface. These methods of deterrence do not lock down the device completely with failed passcode attempts. So if the user decides to exit the access management authentication interface, he can resume normal use of the device without the restricted data or functionalities.

The present disclosure discusses a number of possible implementations that address the aforementioned challenges and create desirable features in access management software for mobile devices. To facilitate discussion, examples are set forth in the context of parental control in a mobile device. However, the same principles apply to other mobile devices and other access management contexts. The examples should not be construed to limit the claims in these respects.

Example Mobile Device

Figure 1A:
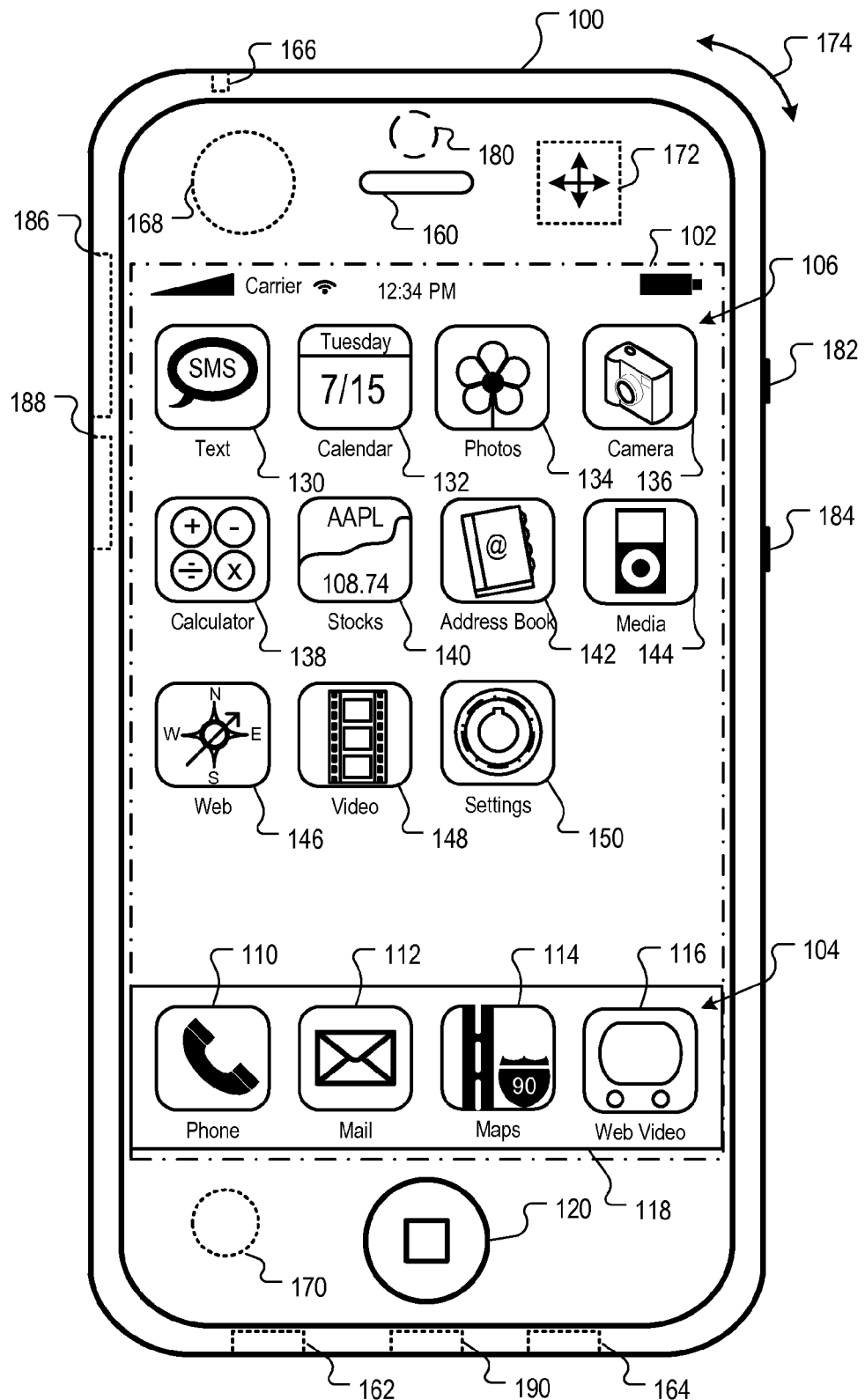
FIG. 1A illustrates an example mobile device.

FIG. 1A illustrates an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can be implemented with liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a Phone object 110; an e-mail device, as indicated by the Mail object 112; a map devices, as indicated by the Maps object 114; a Wi-Fi base station device (not shown); and a network video transmission and display device, as indicated by the Web Video object 116. In some implementations, particular display objects 104, e.g., the Phone object 110, the Mail object 112, the Maps object 114, and the Web Video object 116, can be displayed in a menu bar 118. In some implementations, device functionalities can be accessed from a top-level graphical user interface, such as the graphical user interface illustrated in FIG. 1A. Touching one of the objects 110, 112, 114, or 116 can, for example, invoke a corresponding functionality.

In some implementations, the mobile device 100 can implement a network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of a device functionality, the graphical user interface of the mobile device 100 changes, or is augmented or replaced with another user interface or user interface elements, to facilitate user access to particular functions associated with the corresponding device functionality. For example, in response to a user touching the Phone object 110, the graphical user interface of the touch-sensitive display 102 may present display objects related to various phone functions; likewise, touching of the Mail object 112 may cause the graphical user interface to present display objects related to various e-mail functions; touching the Maps object 114 may cause the graphical user interface to present display objects related to various maps functions; and touching the Web Video object 116 may cause the graphical user interface to present display objects related to various web video functions.

In some implementations, the top-level graphical user interface environment or state of FIG. 1A can be restored by pressing a button 120 located near the bottom of the mobile device 100. In some implementations, each corresponding device functionality may have corresponding "home" display objects displayed on the touch-sensitive display 102, and the graphical user interface environment of FIG. 1A can be restored by pressing the "home" display object.

In some implementations, the top-level graphical user interface can include additional display objects 106, such as a short messaging service (SMS) object 130, a Calendar object 132, a Photos object 134, a Camera object 136, a Calculator object 138, a Stocks object 140, a Address Book object 142, a Media object 144, a Web object 146, a Video object 148, a Settings object 150, and a Notes object (not shown). Touching the SMS display object 130 can, for example, invoke an SMS messaging environment and supporting functionality; likewise, each selection of a display object 132, 134, 136, 138, 140, 142, 144, 146, 148, and 150 can invoke a corresponding object environment and functionality.

Additional and/or different display objects can also be displayed in the graphical user interface of FIG. 1A. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Configurable Top-Level Graphical User Interface

Figure 1B:
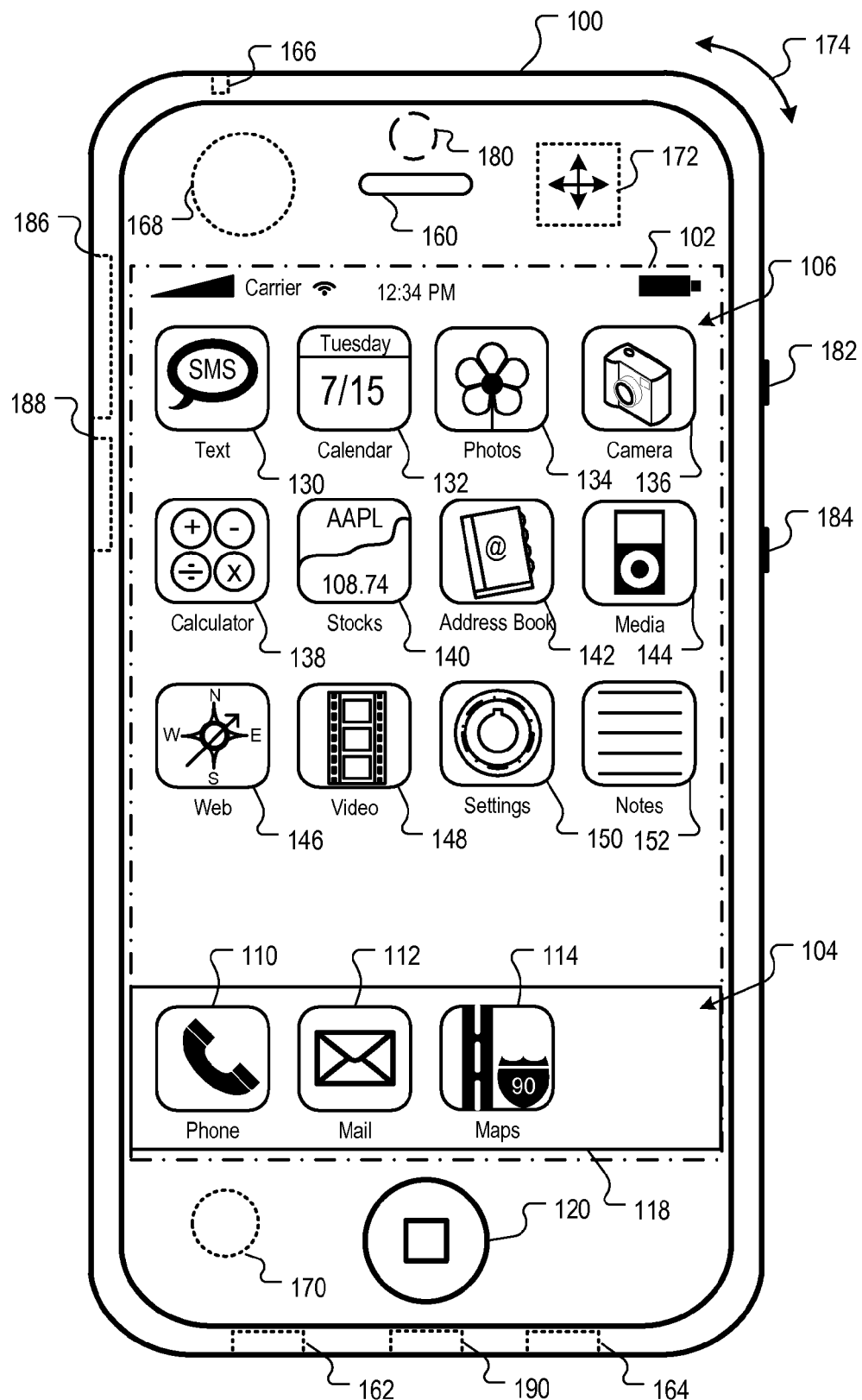
FIG. 1B illustrates an example mobile device with certain display objects added or removed from the top-level graphical user interface.

FIG. 1B illustrates another example of configurable top-level graphical user interface of device 100. The device 100 can be configured to display a different set of display objects.

In some implementations, each of one or more system objects of device 100 has a set of system object attributes associated with it; and one of the attributes determines whether a display object for the system object will be rendered in the top-level graphical user interface. This attribute can be set by the system automatically, or by a user through certain programs or system functionalities as described below. FIG. 1B shows an example of how the Notes object 152 (not shown in FIG. 1A) is added to and the Web Video object 116 is removed from the top graphical user interface of device 100 (e.g. such as when the attributes of the Notes system object and the Web Video system object are modified).

Enabling Parental Controls Example

FIG. 2A illustrates an example user interface for enabling parental controls on the mobile device 100.

In some implementations, the graphical user interface on the touch sensitive display 202 for the parental control functionality can include the following interface elements: a "home" display object 210 that can restore the display to an upper-level graphical user interface, a text object 220 identifying the functionality associated with the present graphical user interface, a touch sensitive display object 230 for enabling parental control settings, and a window 240 showing current parental control settings for installed programs. The window 240 can contain display objects for installed programs and their respective access restriction settings. The window 240 contains, for example, a content filter display object 250 and its access restriction setting 255, a Web display object 260 and its access restriction setting 265, a Web Video display object 270 and its access restriction setting 275, a Notes display object 280 and its access restriction setting 285, a partially covered Video display object 290 and its access restriction setting 295, and other display objects and associated access restriction settings for installed programs, data, or functionalities (not shown).

In some implementations, the parental control functionality on the mobile device 100 can be invoked by touching the Settings display object 150. In some implementations, upon invoking the Settings functionality, a Settings graphical user interface will allow the user to invoke the General, and the Parental Control functionalities by, for example, successively descending through the Settings hierarchy.

In some implementations, the graphical user interface for parental control of the mobile device 100 can include a corresponding "home" display object 210 displayed on the touch-sensitive display 202, and the graphical user interface environment of a previous level in the "Settings" hierarchy, for instance, the General functionality can be restored by pressing the "home" display object 210.

In some implementations, the graphical user interface for parental control of the mobile device can include a touch sensitive display object 230 displayed on the touch sensitive display 202. The touch sensitive display object 230 can contain text or graphics prompting a user to activate the parental control settings window 240 by, for example, pressing on the display object 230. The graphical user interface environment for passcode authentication for the parental control settings can be invoked by, for example, pressing the display object 230. In some implementations, other types of authentication based on various physiological or behavioral biometric characteristics, such as fingerprint or voice, can be invoked in place of passcode authentication.

In some implementations, the graphical user interface for parental control of mobile device 100 can include a window 240 on the touch sensitive display 202. The window 240 can show the current access management or parental control settings for content filters, programs, data, or functionalities existing on the device 100. In some implementations, the content filters, data, programs, and functionalities are set forth as lists of icons or textual labels. In some implementations, the access restrictions can be set by an "on/off" switch. In some implementations, the access restrictions can be set with additional levels. In some implementations, the access restrictions can be specified differently for different user profiles.

In some implementations, the window 240 is inactive, and does not respond to touch. The window 240 can be set out under a semi-transparent overlay such that the current settings of some programs, data, or functionalities are visible, though inactive. In some implementations, the window 240 is completely opaque or nonexistent such that the current settings are not visible to users until the access authentication to the parental control settings has been passed.

In the present example, the parental control settings 255, 265, 275, and 295 for the content filter object 250, the Web object 260, the Web Video object 270, and the Video object 290, respectively, are set to "ON" indicating that these programs or functionalities are active and generally available in the device 100. The parental control settings 285 for the Notes object 280 is set to "OFF" indicating that the Notes object is not active and unavailable for use in the device 100.

In some implementations, when the access management settings restrict the access to certain data, programs, or functionalities, such as in the case of the Notes object 280, the display object for the Notes object is removed from the top-level graphical user environment. As shown in FIG. 1A, the Notes display object is not present in the display area 102 in FIG. 1A, while the display objects for the Web object 260, the Web Video object 270, and the Video object 290 are all present in the display area 102.

Disabling Parental Controls Example

FIG. 2B illustrates an example user interface for disabling parental controls on the mobile device 100.

In some implementations, FIG. 2B is the same parental control graphical interface in FIG. 2A with an activated parental control settings window and a touch sensitive display object prompting the user to disable the parental control settings.

In some implementations, the graphical user interface on the touch sensitive display 203 for the parental control function can include the following interface elements: a "home" display object 211 that can restore the display to an upper-level graphical user interface, a text object 221 identifying the functionality associated with the present graphical user interface, a touch sensitive display object 231 for disabling the parental control settings, and a window 241 showing the current parental control settings for installed programs. The window 241 can contain display objects for installed programs and their respective access restriction settings. The window 241 can contain, for example, a content filter display object 251 and its access restriction setting 256, a Web display object 261 and its access restriction setting 266, a Web Video display object 271 and its access restriction setting 276, a Notes display object 281 and its access restriction setting 286, a partially covered Video display object 291 and its access restriction setting 296, and other display objects and associated access restriction settings for installed programs, data, or functionalities (not shown). Note that a user can reveal hidden objects in window 241 by touch scrolling using a swiping gesture, for example.

In some implementations, the parental control functionality on the mobile device 100 can be invoked by touching the Settings display object 150. In some implementations, upon invoking the Settings functionality, a Settings graphical user interface will allow the user to invoke the General, and the Parental Control functionalities by successively descending through the Settings hierarchy. If access to the parental control settings has not been previously disabled, the user interface for disabling parental control on the mobile device 100 can appear.

In some implementations, the graphical user interface for parental control of the mobile device 100 can include a corresponding "home" display objects 211 displayed on the touch-sensitive display 203, and the graphical user interface environment of a previous level in the "Settings" hierarchy, for instance, the General functionality can be restored by pressing the "home" display object. In some implementations, leaving the graphical user interface for the parental control functionality without disabling the parental control settings first will leave the parental control settings enabled and ready for modification without further authentication.

In some implementations, the text object 221 operates similarly as the text object 220 in FIG. 2A.

In some implementations, the graphical user interface for parental control of the mobile device 100 in can include a touch sensitive display objects 231 displayed on the touch sensitive display 203. The touch sensitive display object 231 can contain text or graphics prompting a user to deactivate or disable the parental control settings window 241 by, for example, pressing on the display object 231. In some implementations, the graphical user interface environment for passcode authentication for the parental control settings can be invoked by, for example, pressing the display object 231. In some implementations, other types of authentication based on various physiological or behavioral biometric characteristics, such as fingerprint or voice, can be invoked in place of passcode authentication. In some implementations, the parental control settings can be deactivated or disabled by, for example, pressing the display object 231 without further authentication. In some implementations, when the display object 231 is pressed, the parental control settings are deactivated and the graphical user interface 203 can revert to that of the user interface 202 in FIG. 2A. In some implementations, when the display object 231 is pressed, the parental control settings are deactivated and an upper-level graphical user interface can be restored. In some implementations, when the parental control settings are deactivated, a user will not be able to change the parental control settings before re-enabling the parental control settings and go through the appropriate authentication process again.

In some implementations, the graphical user interface for parental control of the mobile device can include a window 241 on the touch sensitive display 203. The window 241 can show the current access management or parental control settings for the content filters, programs, data, or functionalities existing on the device 100. In some implementations, the content filters, data, programs, and functionalities are set forth as lists of icons or textual labels. In some implementations, the access restrictions can be set by an "on/off" switch. In some implementations, the access restrictions can be set with additional levels. In some implementations, the access restrictions can be specified differently for different user profiles.

In some implementations, the window 241 is active, and responds to touch. The current settings of some programs, data, and functionalities are visible and can respond to touch. The current settings of the programs, data, and functionalities can be modified by, for example, pressing on the settings or the icons themselves. The window 241 can be scrolled up and down so the entire list of programs, data, and functionalities and their respective access restriction settings on device 100 can be reviewed and edited.

In the present example, the parental control settings in FIG. 2B has changed from that in FIG. 2A. The parental control settings 256, 266, 286, and 296 for the content filter object 251, the Web object 261, the Notes object 281, and the Video object 291 are set to "ON" indicating that these programs or functionalities are active and generally available in the device 100. The parental control settings 276 for the Web Video object 271 is set to "OFF" indicating that the Web Video object is not active and unavailable for use in the device 100.

In some implementations, when the access management settings restrict the access to certain data, programs, or functionalities, such as in the case of the Web Video object 271, the display object for the Web Video object is removed from the top-level graphical user interface environment. When the access management settings no longer restrict the access to certain data, program, or functionalities, such as in the case of the Notes object 281, the Notes object is added to the top-level graphical user interface environment. As shown in FIG. 1B, the Web Video display object is no longer present in the display area 102, while the display objects for the Notes object 281 is added to the display area 102. In some implementations, the display objects for programs and functionalities that are presently disabled in parental control can be concealed in all user interface environments outside of the active parental control settings window 241. In some implementations, the display objects for programs and functionalities that are presently disabled in parental control can be a generic display object such that the restricted programs and functionalities cannot be identified in user interfaces outside of the active parental control settings window 241.

In some implementations, all programs and functions installed on the mobile device 100 can be listed in the parental control settings window 241. In some implementations, a subset of programs or functionalities that relate to media content can be listed in the parental control settings window 241. In some implementations, a subset of programs that contain access to personal data or business data can be listed in the parental control settings window 241. In some implementations, a subset of programs that require additional chargeable services can be listed in the parental control settings window 241.

In some implementations, the same techniques discussed above can be implemented in access management programs in other contexts.

Passcode Entry Example

Figure 3:
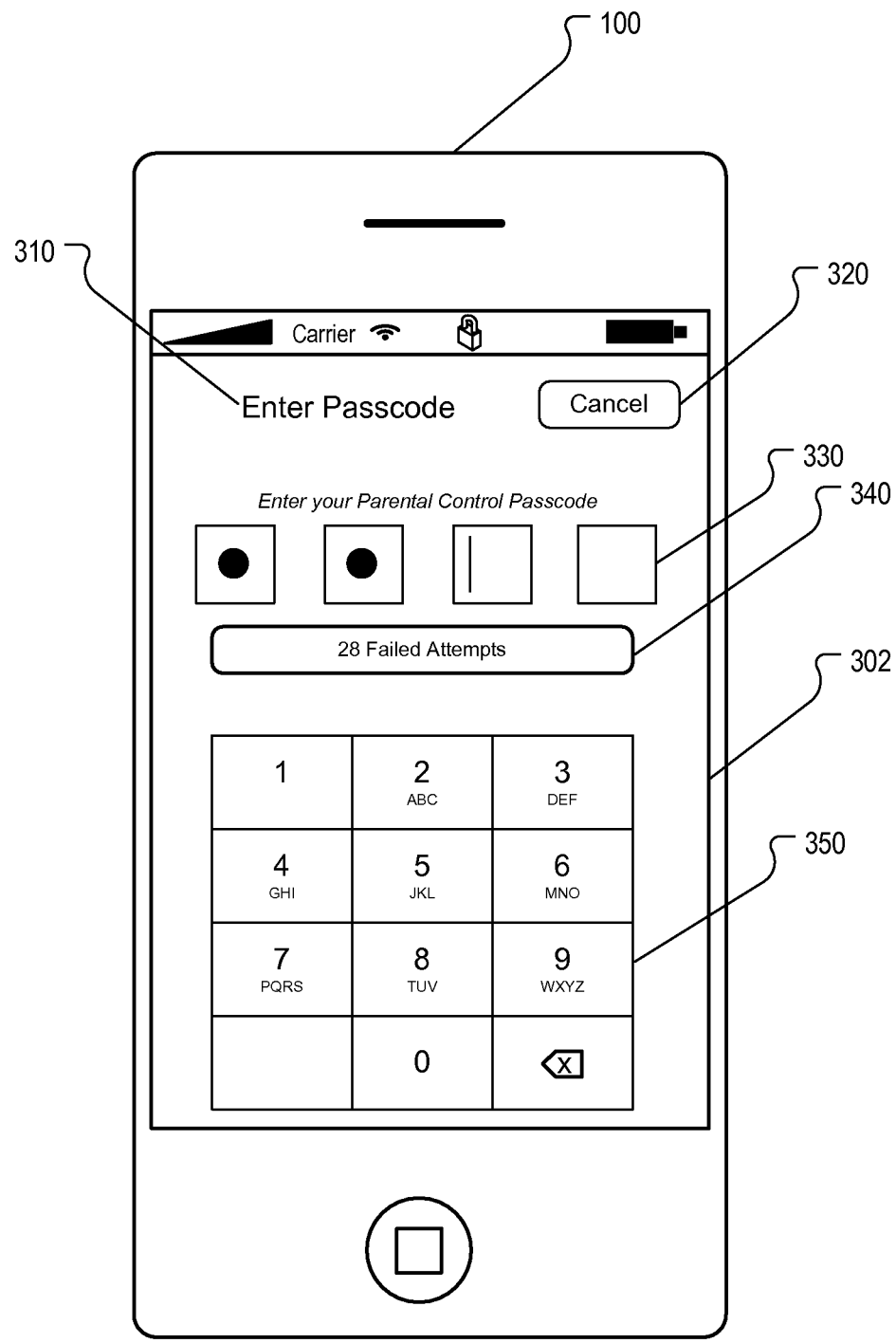
FIG. 3 illustrates an example user interface for entering a passcode for parental controls on the mobile device of FIG. 1A.

FIG. 3 illustrates an example user interface for entering a passcode for parental controls on the mobile device 100.

In some implementations, the graphical user interface on the touch sensitive display 302 for entering a passcode can include the following interface elements: a text object 310 identifying the functionality associated with the present user interface, a "Cancel" display object 320, one or more window objects 330 for entering the passcode, an indicator object 340 showing the number of previous failed passcode attempts, and a touch sensitive keypad 350 containing symbols for composing the passcode.

In some implementations, the user interface for entering a passcode for parental control on the mobile device can be invoked when, for example, the display object 230 is pressed to enable/activate the parental control settings window 240. In some implementations, when a user wishes to enable the parental control settings window 240, the passcode authentication interface can be required. In some implementations, the passcode authentication interface can be displayed when a user wishes to deactivate the parental control settings window 241 by, for example, pressing on the display object 231. In some implementations, the passcode authentication interface can be displayed when the user wishes to access the Parental Control functionality from the Settings/General user interface.

In some implementations, the text object 310 can denote the user interface 302 as a passcode entry interface.

In some implementations, the graphical user interface includes a "Cancel" display object 320 that allows the user to cancel the passcode entry and restores the graphical user interface to an upper-level graphical user interface. In some implementations, when the "Cancel" display object 320 is pressed, the top-level graphical user interface of FIG. 1A or FIG. 1B can appear. In some implementations, when the "Cancel" display object 320 is pressed, the graphical user interface of FIG. 2A or FIG. 2B can appear. In some implementations, when the "Cancel" display object 320 is pressed, the accessibility of the parental control settings can remain unchanged. In some implementations, the "Cancel" display object 320 is a touch sensitive button. In some implementations, the home button 120 on device 100 can achieve the same effect as the "Cancel" display object 320 when pressed.

In some implementations, the graphical user interface in the display area 302 can include one or more window objects 330 for entering the passcode. In some implementations, the display area 302 can include multiple windows, each of which can hold one or more passcode symbols. In some implementations, the display area 302 can include a single window which can hold the complete passcode. In some implementations, the window can contain a cursor. In some implementations, the passcode can be masked by a preset symbol such that it is not revealed to a third party as it is being entered into the window(s) 330. In some implementations, text or graphics can be displayed next to the window objects 330 prompting the user to enter a passcode.

In some implementations, the graphical user interface in the display area 302 can include an indicator 340 for the number of past failed passcode attempts. In some implementations, the indicator 340 is a visual representation of the number of past failed passcode attempts. In some implementations, the indicator can be a sentence such as "X Failed Attempt(s)", X being the number of failed passcode attempts. In some implementations, the indicator 340 can be a graphical object showing the number of failed attempts by varying its length, height, shape, or color. In some implementations, the indicator 340 can be other kinds of visual effects that are used to alert the user of the increasing number of failed passcode attempts.

In some implementations, the indicator 340 showing the number of failed passcode attempts can remain on the graphical user interface for the parental control functionality until a correct parental control passcode has been entered and authenticated.

In some implementations, an additional indicator can be shown on the top-level graphical user interface in FIG. 1A or FIG. 1B to alert the user of the past failed passcode attempts. In some implementations, this additional indicator can be a visual representation of the number of past failed passcode attempts. In some implementations, this additional indicator can be a visual alert of past failed passcode attempts. In some implementations, this additional indicator can remain on the top-level graphical user interface until a correct passcode has been entered and authenticated. In the context of parental control passcode authentication, the additional indicator can alert parents of failed passcode attempts without them having to go into the parental control settings interface. This can help to deter children from attempting to guess the parental control passcode.

In some implementations, the indicator 340 showing the number of failed passcode attempts can be reset automatically when a correct parental control passcode has been entered and authenticated.

In some implementations, the graphical user interface in the display area 302 can include a touch sensitive virtual keypad 350 containing characters or symbols for composing the passcode. A user can press on the keys in the virtual keypad 350 to enter the desired symbols for the passcode. The virtual keypad 350 can include a key for erasing previously entered symbols, such as a backspace key. In some implementations, the virtual keypad is a numeric keypad. In some implementations, the keypad is a virtual keyboard. In some implementations, other symbols may be used in the keypad, for example, symbols or characters used in other languages.

In some implementations, the passcode authentication can be done without symbols, and the passcode can consist of a series of finger movements on or interactions with the touch sensitive display 302.

Figure 4:
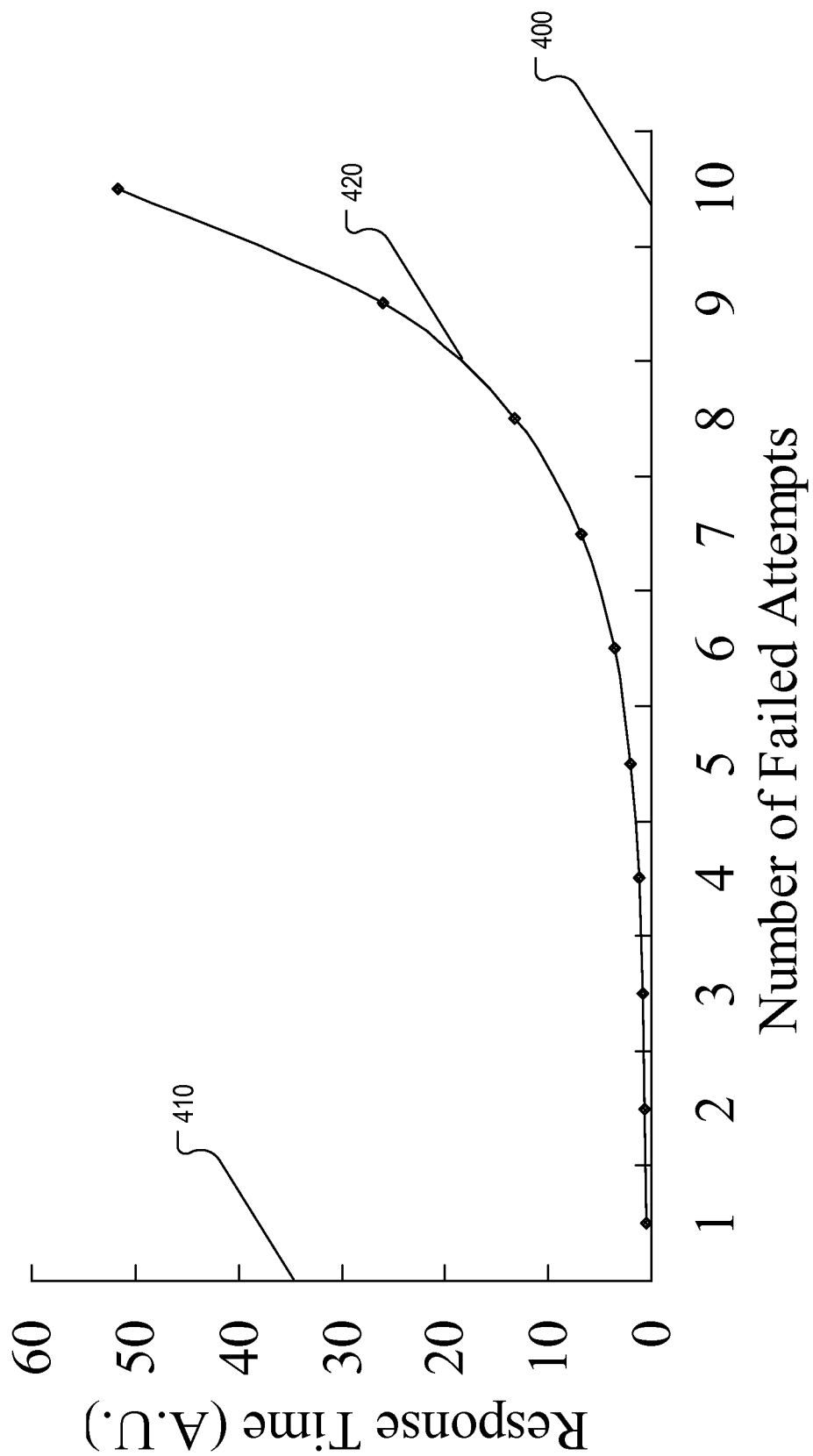
FIG. 4 is a graph illustrating an example process for adjusting response time based on the number of failed passcode attempts on the mobile device of FIG. 1A.

FIG. 4 is a graph illustrating an example process for adjusting response time based on the number of failed passcode attempts on the mobile device 100.

The horizontal axis 400 shows the number of failed passcode attempts. The vertical axis 410 shows the corresponding response time of the device 100 in arbitrary unit (A.U.). In some implementations, each time an incorrect passcode is entered, device 100 generates a delay and lengthens its response time, making it harder for the user to perform the next round of passcode entry.

In some implementations, the delay in response time manifests as an inability to accept user input. For example, the user is not able to enter digits or symbols, into the window(s) 330 during the delay. In some implementations, the delay in response time manifests as a delay in providing sensory feedback to user input. For example, during the delay, the user is not able to perceive any visual indication on the user interface that a user input has been received by the device 100. In some implementations, the delay in response time occurs during user input processing stage. For example, the user input can be received promptly by the device but is not processed during the delay.

In some implementations, user input to cancel and exit the passcode authentication interface, e.g., a touch signal from the "Cancel" display object 320 or the home button 120, can be accepted and processed under normal time; visual feedback and appropriated responses can also be provided without consideration of the delay time.

In some implementations, the response time increases monotonically with increasing number of failed passcode attempts, such as by curve 420 shown in FIG. 4. In some implementations, the response time increases in discrete steps. In some implementations, the response time does not increase until a specified number of permitted passcode attempts have been exhausted. In some implementations, the increase in response time can grow rapidly with increasing number of failed passcode attempts, quickly rendering continued passcode entry increasingly difficult with each attempt. In some implementations, the response time plateaus when the response time is sufficiently long to significantly deter additional entry of passcode guesses.

In some implementations, other means of impeding passcode guessing can be utilized. For example, visual and audio annoyances can be added when the number of failed passcode attempts exceeds a pre-determined limit. In some implementations, the visual annoyances can be flashes of light, or shivering display that tires a user's eyes, for example. In some implementations, the audio annoyances can be beeps or alarms with increasing volumes, for example.

In some implementations, the extended response time can apply only to the passcode entry user interface of FIG. 3. The response time of other functions of the device can remain unaffected. In some implementations, by pressing on a "Cancel" display object 320 or a home button 120, an upper level graphical user interface can be restored, and the user can proceed to use other unrestricted functions of the device as usual.

Visual Indicator and Response Time Adjustment Example

Figure 5:
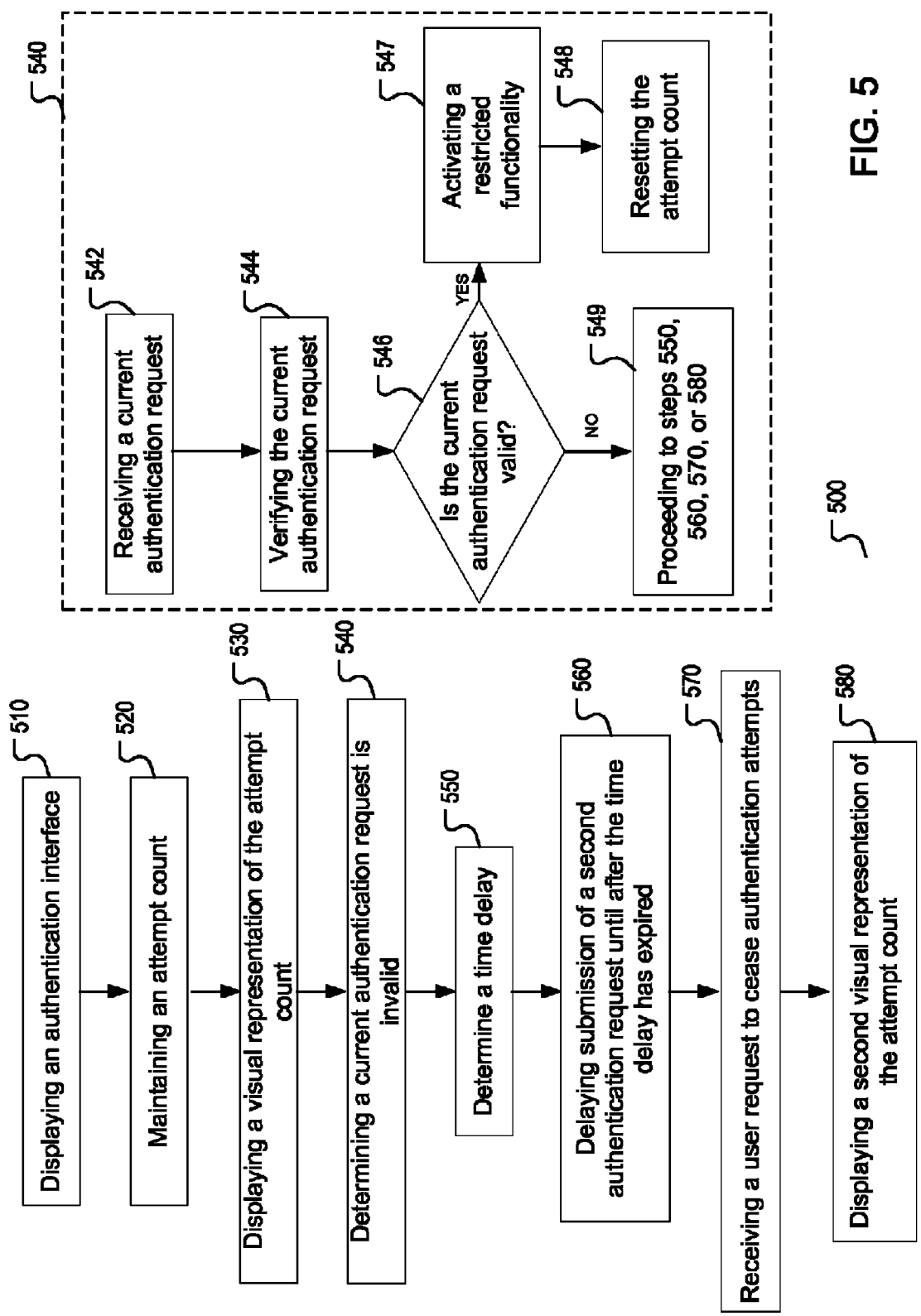
FIG. 5 is a flow diagram of an example process for entering passcodes on the mobile device of FIG. 1A.

FIG. 5 is a flow diagram of an example process 500 for entering passcodes on the mobile device 100. The steps of process 500 do not have to occur in a specific order and at least some steps can occur simultaneously in a multithreading or multiprocessing environment. In some implementations, not all steps of process 500 have to be performed.

The process 500 comprises the following steps: a step 510 for displaying an authentication interface, a step 520 for maintaining an attempt count for failed passcode attempts, a step 530 for displaying a visual representation of the attempt count (e.g., a representation of a counter), a step 540 for determining a current authentication request is invalid, a step 550 for determining a time delay based on the attempt count, a step 560 for delaying submission of a second authentication request until after the time delay has expired, a step 570 for receiving a user request to cease authentication attempts, and a step 580 for displaying a second visual representation of the attempt count in a interface other than the authentication interface.

In some implementations, the step 540 can comprise: a step 542 for receiving a current authentication request, and a step 544 for verifying the passcode. If the passcode is correct, i.e., the current authentication request is valid, the step 540 can further comprise the following steps: a step 547 for activating a restricted functionality corresponding to the authentication request, and, optionally, a step 548 for resetting the attempt count for failed passcode attempts. If the passcode is incorrect, i.e., the current authentication request is determined to be invalid, the step 540 is completed, and the process 500 proceeds with steps 550, 560, 570, or 580.

In some implementations, the authentication interface referred to in step 510 can be the authentication interface 302 shown in FIG. 3. In some implementations, the visual representation of the attempt count in step 530 can be the display object 340 (e.g., a visual representation of a counter) shown in FIG. 3. In some implementations, the step 530 for displaying a visual representation of the attempt count can further comprise a step for updating the visual representation each time the attempt count changes by a pre-determined number. In some implementations, the authentication interface is displayed on a touch sensitive screen. In some implementations, the visual representation of the attempt count is a text object. In some implementations, the visual representation of the attempt count is a graphic object that varies its length, width, shape, or color according to the attempt count value.

In some implementations, the step 520 for maintaining an attempt count can comprise: identifying a counter for failed passcode attempts, and if a current authentication request is determined to be invalid, incrementing the counter.

In some implementations, the attempt count can be a numeric counter that has an initial value of zero. In some implementations, the attempt count can have a value of zero when no incorrect passcode has been ever entered, or when it has been reset by a most recent passcode entry that is correct. In some implementations, the attempt count can be stored in the device memory or other types of storage media connected to device 100 such that the number of previous failed passcode attempts can be retained and displayed in user interfaces.

In some implementations, the step 542 for receiving a current authentication request (e.g., a passcode entry) can further comprise encoding the passcode entry according to a pre-determined algorithm. In some implementations, the pre-determined algorithm can be an encryption algorithm.

In some implementations, the step 544 for verifying the current authentication request (e.g., a passcode entry) can further comprise a step of receiving a pre-determined and correct passcode, and a step of comparing the passcode entry (either encoded or un-encoded) to the pre-determined and correct passcode. In some implementations, the comparison of passcodes can comprise further encoding and manipulations of the passcodes.

If the current authentication request is verified (e.g., the passcode entry is incorrect), the current authentication request is determined to be valid. The step 547 for activating a restricted functionality and the step 558 for resetting the attempt count can then be performed, and in no particular order.

In some implementations, the restricted functionality can relate to a parental control settings interface. In some implementations, the restricted functionality can be a program, data, or functionality that is locked by an access management program on a device.

If the passcode entry is not verified (e.g., the passcode entry is incorrect), the current authentication request is determined to be invalid and the passcode entry is deemed a failed passcode attempt. The process 500 further comprises steps 550, 560, 570 and 590 to deter persistent passcode guessing. With each failed passcode attempt, the attempt count is incremented in step 520. In some implementations, the step 530 for displaying a visual representation of the attempt count can comprise updating the visual representation every few increments of the attempt count. In some implementations, the visual representation of the attempt count can vary in length, width, shape, or color with different attempt count values.

In some implementations, the step 550 for determining a delay in response time can be performed according to the graph in FIG. 4. In some implementations, the delay in response time increases monotonically with increasing number of failed passcode attempts. In some implementations, the delay in response time increases in discrete steps. In some implementations, the delay in response time is zero until a specified number of permitted failed passcode attempts have been exhausted. In some implementations, the delay in response time can grow rapidly with increasing number of failed passcode attempts, quickly rendering continued passcode entry increasingly difficult with each attempt. In some implementations, the delay in response time plateaus when the response time is sufficiently long to significantly deter additional entry of passcode guesses.

In some implementations, the step 560 for delaying submission of a second authentication request can comprise disabling user input functions in the user interface. For example, the user is not able to enter digits or symbols, into the window(s) 330 during the delay. In some implementations, the step 560 for delaying submission of a second authentication request can comprise delaying sensory feedback to user inputs. For example, during the delay, the user is not able to perceive any visual indication on the user interface that a user input has been received by the device. In some implementations, the step 560 for delaying submission of a second authentication request can comprise delaying the processing of user inputs. For example, the user input can be received promptly by the device but is not processed during the delay.

In some implementations, a user input to cancel and exit the passcode authentication interface can be received in step 570. In some implementations, the user input to cancel and exit the passcode authentication interface can be, for example, a touch signal from the "Cancel" display object 320 or the home button 120. In some implementations, the user input to cancel (i.e., to cease passcode attempts) can be accepted and processed in normal time, and visual feedback and appropriated responses can be provided without consideration of the delay time.

In some implementations, an additional step not shown in FIG. 5 can be performed. For example, in some implementations, the step 560 for delaying submission of a second authentication request can be accompanied by a step for outputting visual or audio annoyances to the user interface once the number of failed passcode attempts reaches a predetermined limit.

In some implementations, a step 580 for displaying a second visual representation of the attempt count can be performed. For another example, in some implementations, if the user chooses to exit the passcode authentication interface by pressing a "Cancel" display object 320 or the home button 120 before entering a correct passcode, a step to display a second visual representation of the attempt count in other user interfaces can be performed. This second visual representation alerts the device owner of the past failed passcode attempts without him having to enter the passcode authentication interface. In some implementations, the second visual representation of the attempt count can indicate that one or more failed passcode attempts have occurred.

Managing Access Example

Figure 6:
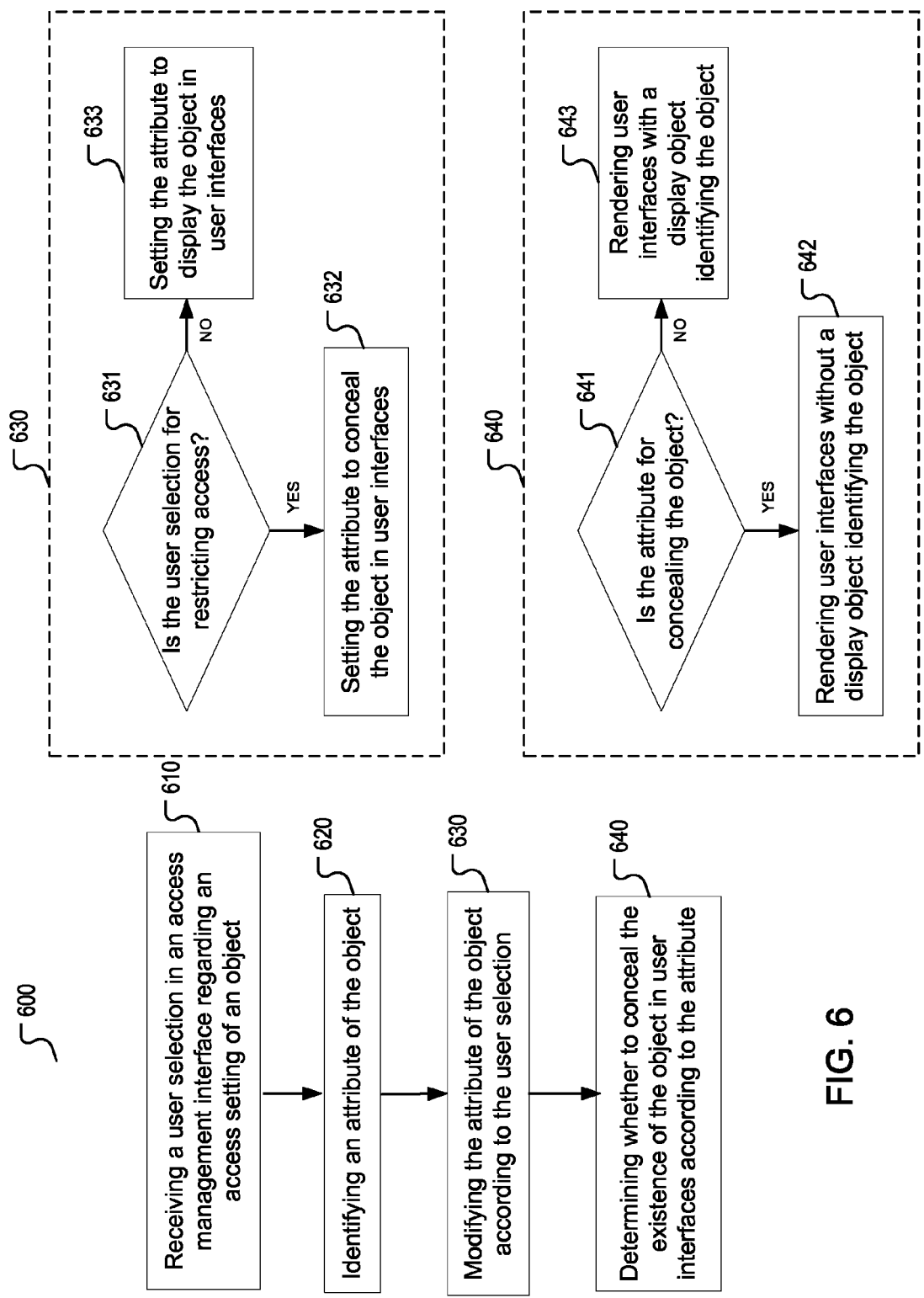
FIG. 6 is a flow diagram of an example process for managing access on the mobile device of FIG. 1B.

FIG. 6 is a flow diagram of an example process 600 for managing access on the mobile device. The steps of process 600 do not have to occur in a specific order and at least some steps can occur simultaneously in a multithreading or multiprocessing environment. In some implementations, not all steps of process 600 have to be performed.

The process 600 comprises the following steps: a step 610 for receiving a user selection in an access management interface regarding an access setting of an object in a mobile device, a step 620 for identifying an attribute of the object, a step 630 for modifying the attribute of the object according to the user selection, and a step 640 for determining whether to conceal the existence of the object in one or more user interfaces according to the attribute.

In some implementations, the step 630 can further comprise the following steps: if the user selection is for restricting access to the object, a step 632 for setting the attribute to conceal the object in the one or more user interfaces; if the user selection is for granting access to the object, a step 633 for setting the attribute to display the object in the one or more user interfaces.

In some implementations, the step 640 can further comprise the following steps: if the attribute is set to conceal the object in the one or more user interfaces, a step 642 for rendering the one or more user interfaces without a display object identifying the object; if the attribute is set to display the object in the one or more user interfaces, a step 643 for rendering the one or more user interfaces with a display object identifying the object.

In some implementations, the access management interface in step 610 can be a parental control user interface. In some implementations, the access setting to an object in step 610 can be either restricting access or granting access to the object, wherein the object can be a program, data, or functionality in a mobile device.

In some implementations, the object in process 600 can have one or more attributes associated with it. In some implementations, one of the one or more attributes determines whether a display object or icon identifying the object will be rendered or displayed in a graphical user interface. In some implementations, the default setting for the attribute is to display the display object or icon identifying the object in graphical user interfaces.

In some implementations, in step 630 for modifying the attribute of the object according to the user selection, if the user selection is for restricting access to the object without authentication, the attribute is set to conceal the object in graphical user interfaces; if the user selection is for granting access to the object, the attribute is set to display the object in graphical user interfaces. In some implementations, if the restriction on access is different for different user profiles, the attribute is set differently for each of the different user profiles.

In some implementations, the step 642 for rendering user interfaces without a display object identifying the object can comprise rendering a generic display object for the object. In some implementations, the step 642 can comprise rendering user interfaces without any display object for the object. In the context of parental control in a mobile device, for example, if a parent deactivates a program in the mobile device, the icon for that program can be removed from the top-level graphical user interface or a generic icon for inactive programs can be used in place of the icon for that program; if the parent subsequently re-activate the same program after successfully passing the authentication interface, the icon for that program can reappear in the top-level graphical user interface.

In some implementations, attributes related to other properties of the object can also be modified by the user selection in an access management interface.

Example Mobile Device Architecture

Figure 7:
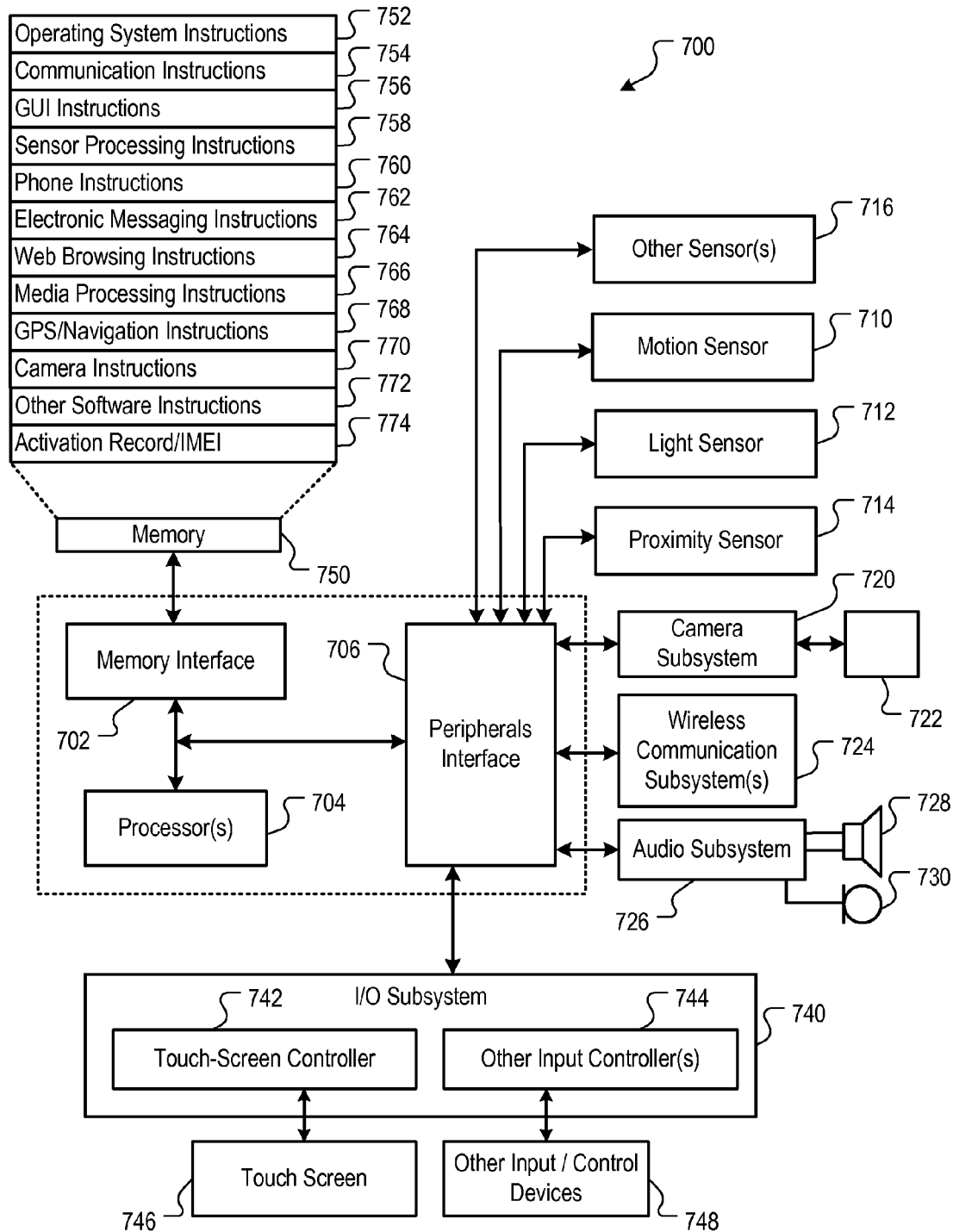
FIG. 7 is a block diagram of an example architecture of the mobile device of FIG. 1A.

FIG. 7 is a block diagram 700 of an example implementation of a mobile device (e.g., mobile device 100). The mobile device can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the mobile device can be coupled by one or more communication buses or signal lines.

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate the orientation, lighting, and proximity functions described with respect to FIG. 1A. Other sensors 716 can also be connected to the peripherals interface 706, such as a positioning system (e.g., GPS receiver), a temperature sensor, a biometric sensor, or other sensing device, to facilitate related functionalities.

A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the mobile device is intended to operate. For example, a mobile device can include communication subsystems 724 designed to operate over a GSM network, a GPRS network, an EDGE network, a Wi-Fi or WiMax network, and a Bluetooth™ network. In particular, the wireless communication subsystems 724 may include hosting protocols such that the mobile device may be configured as a base station for other wireless devices.

An audio subsystem 726 can be coupled to a speaker 728 and a microphone 730 to facilitate voice-enabled functions, such as voice recognition, voice replication, digital recording, and telephony functions.

The I/O subsystem 740 can include a touch screen controller 742 and/or other input controller(s) 744. The touch-screen controller 742 can be coupled to a touch screen 746. The touch screen 746 and touch screen controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In one implementation, a pressing of the button for a first duration may disengage a lock of the touch screen 746; and a pressing of the button for a second duration that is longer than the first duration may turn power to the mobile device on or off. The user may be able to customize a functionality of one or more of the buttons. The touch screen 746 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player, such as an iPod™. The mobile device may, therefore, include a 32-pin connector that is compatible with the iPod™. Other input/output and control devices can also be used.

The memory interface 702 can be coupled to memory 750. The memory 750 can include high-speed random access memory and/or non-volatile memory, such as one or more magnetic disk storage devices, one or more optical storage devices, and/or flash memory (e.g., NAND, NOR). The memory 750 can store an operating system 752, such as Darwin, RTXC, LINUX, UNIX, OS X, WINDOWS, or an embedded operating system such as VxWorks. The operating system 752 may include instructions for handling basic system services and for performing hardware dependent tasks. In some implementations, the operating system 752 can be a kernel (e.g., UNIX kernel).

The memory 750 may also store communication instructions 754 to facilitate communicating with one or more additional devices, one or more computers and/or one or more servers. The memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; and/or other software instructions 772 to facilitate other processes and functions, e.g., access control management functions as described in reference to FIGS. 5 and 6. The memory 750 may also store other software instructions (not shown), such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) 774 or similar hardware identifier can also be stored in memory 750.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions of the mobile device may be implemented in hardware and/or in software, including in one or more signal processing and/or application specific integrated circuits.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal), that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code).

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube), LCD (liquid crystal display) monitor, touch sensitive device or display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed:

1. A method for controlling access at a mobile device, the method comprising:
   receiving, from a user, a request to access restricted components of the mobile device;
   displaying an authentication interface that requests a passcode input from a user;
   receiving at least one incorrect passcode input from the user;
   in response to receiving the at least one incorrect passcode input:
      increasing visual disturbances or audible disturbances at the mobile device with each successive incorrect passcode input;
   displaying a visual alert of a number of incorrect passcode inputs received from the user, wherein the visual alert persists outside of the authentication interface; and
   in response to a request from the user to exit the authentication interface when a correct passcode input has not been received:
      allowing a use of the mobile device to resume without enabling access to the restricted components.

2. The method of claim 1, wherein the components comprise particular data stored on the mobile device or particular features provided by the mobile device.

3. The method of claim 2, wherein the authentication interface secures access to a parental control interface that controls a manner in which the components of the mobile device can be accessed.

4. The method of claim 1, further comprising:
   in response to receiving a correct passcode input from the user:
      enabling the user to access the components.

5. The method of claim 4, further comprising:
   resetting the displayed number of incorrect passcode inputs received from the user.

6. The method of claim 1, wherein the visual disturbances include flashes of light or a shivering the authentication interface.

7. The method of claim 1, wherein the audible disturbances include beeps or alarms.

8. A non-transitory computer readable storage medium configured to store instructions that, when executed by a processor included in a mobile device, cause the mobile device to carry out steps that include:
   receiving, from a user, a request to access restricted components of the mobile device;
   displaying an authentication interface that requests a passcode input from a user;
   receiving at least one incorrect passcode input from the user;
   in response to receiving the at least one incorrect passcode input:
      increasing visual disturbances or audible disturbances at the mobile device with each successive incorrect passcode input;
   displaying a visual alert of a number of incorrect passcode inputs received from the user, wherein the visual alert persists outside of the authentication interface; and
   in response to a request from the user to exit the authentication interface when a correct passcode input has not been received:
      allowing a use of the mobile device to resume without enabling access to the restricted components.

9. The non-transitory computer readable storage medium of claim 8, wherein the components comprise particular data stored on the mobile device or particular features provided by the mobile device.

10. The non-transitory computer readable storage medium of claim 9, wherein the authentication interface secures access to a parental control interface that controls a manner in which the components of the mobile device can be accessed.

11. The non-transitory computer readable storage medium of claim 8, wherein the steps further include:
   in response to receiving a correct passcode input from the user:
      enabling the user to access the components.

12. The non-transitory computer readable storage medium of claim 11, wherein the steps further include:
   resetting the displayed number of incorrect passcode inputs received from the user.

13. The non-transitory computer readable storage medium of claim 8, wherein the visual disturbances include flashes of light or a shivering the authentication interface.

14. The non-transitory computer readable storage medium of claim 8, wherein the audible disturbances include beeps or alarms.

15. A mobile device, comprising:
   a processor; and
   a memory configured to store instructions that, when executed by the processor, cause the mobile device to carry out steps that include:
      receiving, from a user, a request to access restricted components of the mobile device;
      displaying an authentication interface that requests a passcode input from a user;
      receiving at least one incorrect passcode input from the user;
      in response to receiving the at least one incorrect passcode input:
         increasing visual disturbances or audible disturbances at the mobile device with each successive incorrect passcode input;
      displaying a visual alert of a number of incorrect passcode inputs received from the user, wherein the visual alert persists outside of the authentication interface; and
      in response to a request from the user to exit the authentication interface when a correct passcode input has not been received:
         allowing a use of the mobile device to resume without enabling access to the restricted components.

16. The mobile device of claim 15, wherein the components comprise particular data stored on the mobile device or particular features provided by the mobile device.

17. The mobile device of claim 16, wherein the authentication interface secures access to a parental control interface that controls a manner in which the components of the mobile device can be accessed.

18. The mobile device of claim 15, wherein the steps further include:
   in response to receiving a correct passcode input from the user:
   enabling the user to access the components.

19. The mobile device of claim 18, wherein the steps further include:
   resetting the displayed number of incorrect passcode inputs received from the user.

20. The mobile device of claim 15, wherein the visual disturbances include flashes of light or a shivering the authentication interface.

21. The mobile device of claim 15, wherein the audible disturbances include beeps or alarms.

* * * * *

UNITED STATES PATENT AND TRADEMARK OFFICE
CERTIFICATE OF CORRECTION

| | | |
|---|---|---|
| PATENT NO. | : 8,909,297 B2 | Page 1 of 1 |
| APPLICATION NO. | : 12/042268 | |
| DATED | : December 9, 2014 | |
| INVENTOR(S) | : Mike Matas et al. | |

It is certified that error appears in the above-identified patent and that said Letters Patent is hereby corrected as shown below:

On the Title Page, Item (76): "Marcel M W A van Os" should read --Marcel MWA Van Os--.

In the Claims:

Column 19, line 25 (Claim 1, line 6): "a user" should read --the user--.

Column 19, line 66 (Claim 8, line 8): "a user" should read --the user--.

Column 20, line 48 (Claim 15, line 9): "a user" should read --the user--.

Signed and Sealed this
Fourteenth Day of April, 2015

Michelle K. Lee
*Director of the United States Patent and Trademark Office*